United States Patent [19]

Bloch

[11] Patent Number: 4,747,413

[45] Date of Patent: May 31, 1988

[54] INFANT TEMPERATURE MEASURING APPARATUS AND METHODS

[76] Inventor: Harry S. Bloch, 871 Green Ridge Cir., Langhorne, Pa. 19047

[21] Appl. No.: 928,441

[22] Filed: Nov. 7, 1986

[51] Int. Cl.$^4$ .............................................. A61B 5/00
[52] U.S. Cl. ..................................... 128/736; 128/903; 340/870.17; 374/110; 374/163
[58] Field of Search ................. 374/141, 163, 122; 340/870.17; 128/736, 903; 206/306; 2/247, 249, DIG. 7

[56] References Cited

U.S. PATENT DOCUMENTS

| | | |
|---|---|---|
| 2,706,378 | 4/1955 | Goldman .............................. 2/249 X |
| 3,306,282 | 2/1967 | Pierce ................................. 128/736 X |
| 3,441,513 | 4/1969 | Woodmansae ..................... 128/736 |
| 3,661,142 | 5/1972 | Flam . |
| 3,802,945 | 4/1974 | James . |
| 3,830,224 | 8/1974 | Vanzetti et al. . |
| 3,847,139 | 11/1974 | Flam . |
| 3,851,320 | 11/1974 | Dahl ................................... 128/903 X |
| 3,852,092 | 12/1974 | Patterson et al. . |
| 3,921,621 | 11/1975 | Baessler ........................... 374/110 X |
| 3,951,133 | 4/1976 | Reese . |
| 4,043,324 | 8/1977 | Shaw, IV . |
| 4,048,359 | 9/1977 | Shibansi et al. . |
| 4,055,855 | 11/1977 | Ragone et al. ....................... 2/114 |
| 4,064,872 | 12/1977 | Caplan . |
| 4,070,912 | 1/1978 | McNaughtan . |
| 4,138,889 | 2/1979 | Fraschini . |
| 4,302,971 | 12/1981 | Luk . |
| 4,444,517 | 4/1984 | Murase ............................. 374/208 X |
| 4,450,843 | 5/1984 | Barney et al. .................... 128/736 X |
| 4,464,064 | 8/1984 | D'Luzansky ...................... 374/101 |
| 4,509,533 | 4/1985 | Chervitz ............................ 128/736 |
| 4,510,188 | 4/1985 | Ruggeri . |
| 4,524,778 | 6/1985 | Brown, Jr. et al. .............. 128/736 |
| 4,572,197 | 2/1986 | Moore et al. ..................... 128/644 |
| 4,608,565 | 8/1986 | Sakamoto ..................... 340/870.17 |
| 4,681,118 | 7/1987 | Asai et al. ......................... 128/903 |
| 4,698,848 | 10/1987 | Buckley ............................... 2/247 X |

Primary Examiner—Daniel M. Yasich
Attorney, Agent, or Firm—Panitch, Schwarze, Jacobs and Nadel

[57] ABSTRACT

A continuous temperature monitoring apparatus for a human infant includes a garment adapted to be worn on an infant's torso, over the armpits, which includes a temperature sensor located in an armpit of the garment for sensing the infant's temperature. The sensor is functionally coupled with a display on the garment, transmits a radio signal indication of infant armpit temperature to a display device remote from the infant or both. Electronic temperature sensor embodiments are functionally coupled to an electronic display device located on the infant by a flexible lead or by radio transmission to a remotely located electronic display. Non-electrical systems include temperature responsive, chemical liquid crystal displays thermally coupled by flexible metallic, heat transferring arms with a more rigid, massive, metallic heat absorbing element positioned against the infant's armpit for thermally coupling the heat responsive chemical display with the infant's armpit.

10 Claims, 2 Drawing Sheets

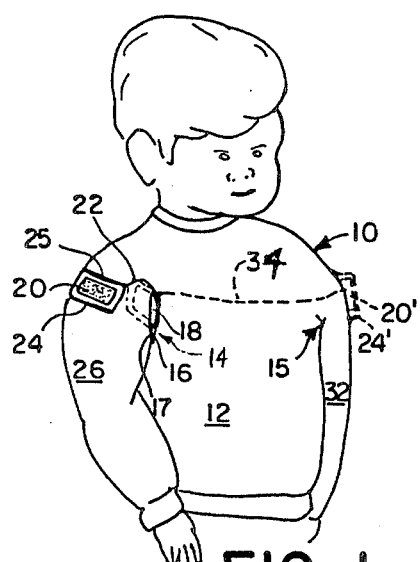
FIG. 1
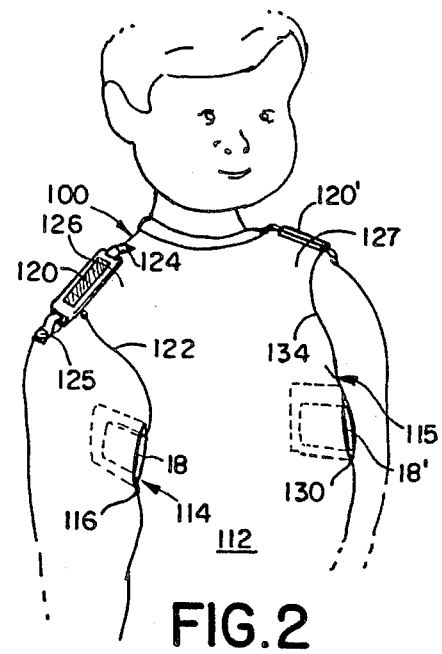
FIG. 2
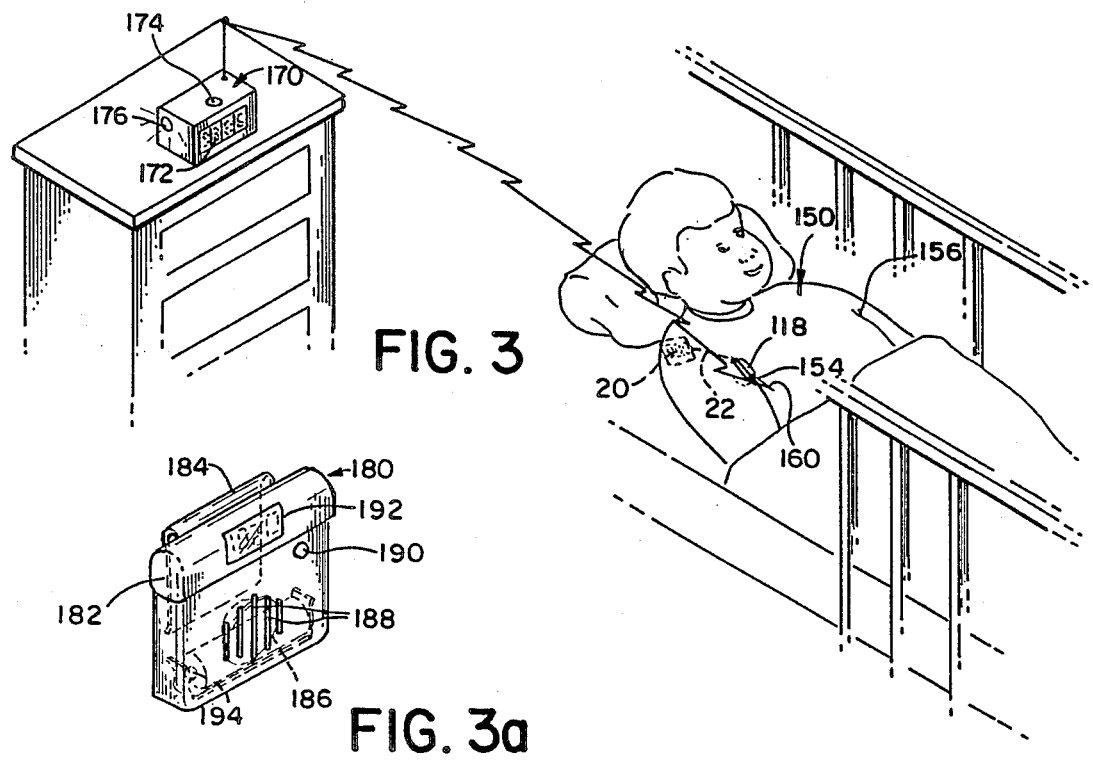
FIG. 3
FIG. 3a

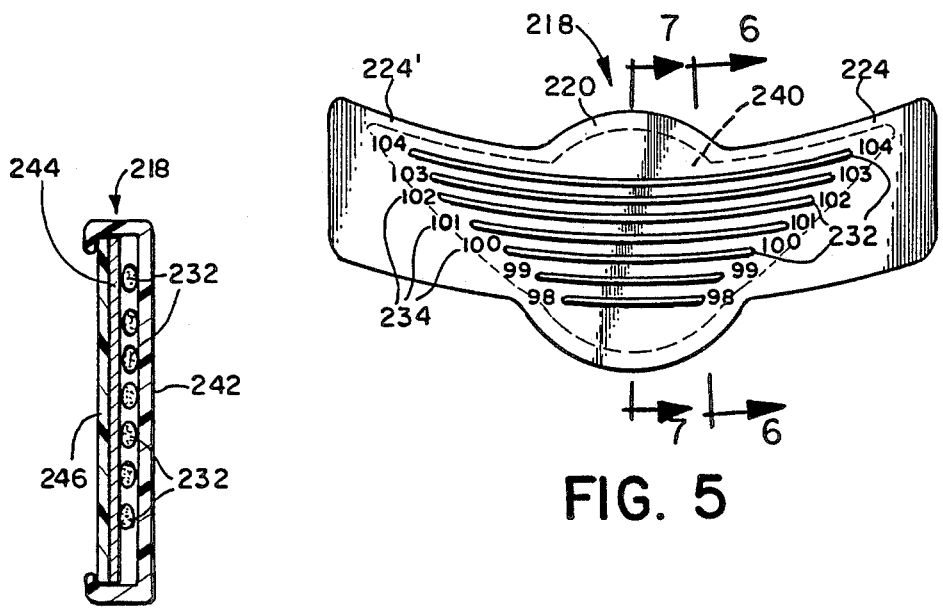
FIG. 5
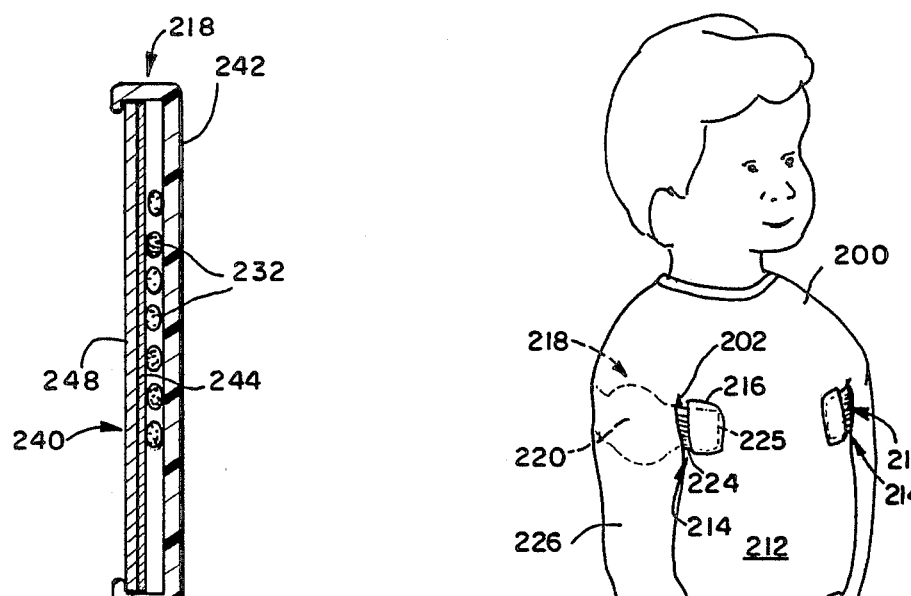
FIG. 6
FIG. 7
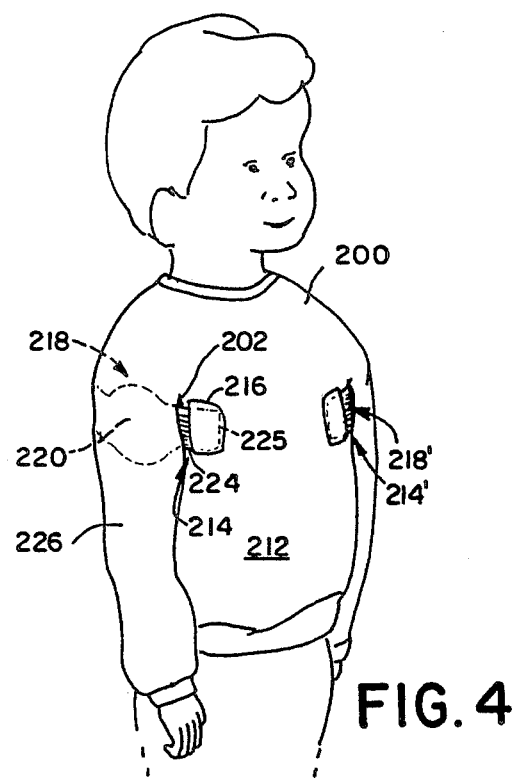
FIG. 4

INFANT TEMPERATURE MEASURING APPARATUS AND METHODS

FIELD OF THE INVENTION

The invention relates to clinical temperature measuring and, in particular, to an apparatus and method adapted for the continuous, non-intrusive measuring and indication of temperature of a human infant.

BACKGROUND OF THE INVENTION

For some time, glass encased, liquid temperature measuring devices were the only devices available for measuring temperature, including the temperatures of living things, with any accuracy. However, the use of such devices has always been fraught with potential danger. Glass tubes originally used for encasing the fluid were easily breakable. While alcohol is used as an indicating fluid under certain circumstances, mercury is the preferred fluid for easy and accurate measurement of human temperatures, but is a hazardous substance. In addition to the dangers posed generally to humans, such devices pose a particular potential danger to infants. Typically, the thermometer is anally inserted into the infant because of the much greater danger of breakage from oral insertion. However, infants often react to the insertion of a thermometer with vigorous movement, which may dislodge the thermometer or, more seriously, break the thermometer. Both the infant and the thermometer should be held during the entire temperaturemeasuring procedure, to prevent dislodgement, undue insertion or breakage of the thermometer.

Recent improvements in the area of clinical thermometer and temperature measuring devices have been in two major directions. One has been the development of electronic, probe-type thermometers. These represent a major improvement in safety and convenience. Commercially available electronic thermometers for home use typically include an exposed sensor tip at one end and an electronic display at an opposing, handle end. The devices are made of unbreakable plastic and metal materials and represent a significant increase in safety over glass thermometers. The temperature displays are typically digital and indicate a single number, making them both easier to read and to understand. Despite their improvements, such devices still must be continually held in order to prevent either dislodgement or injury to the infant. Also, the circuitry of such devices is typically designed to display an actual temperature when the actual temperature has been determined and not display another temperature until manually reset by the user.

Another direction of improvement in clinical thermometers has been toward the use of temperature sensitive liquid crystal devices. Certain materials, such as chlorestic esters, change physical states at predetermined temperatures or within a range of predetermined temperatures. Such crystals are discussed in great detail in U.S. Pat. No. 4,070,912 and 3,661,142. Use of such crystals in clinical thermometer devices is discussed in those patents, as well as in U.S. Pat. Nos. 4,509,533; 4,302,971; and 4,138,889. Related uses of such liquid crystals as body surface temperature diagnostic tools, particularly the formation of body clothing from liquid crystal fabrics, are disclosed and discussed in U.S. Pat. Nos. 4,524,778; 4,064,872; 4,043,324; 3,951,133; 3,847,139; and 3,830,224. U.S. Pat. No. 4,510,188; 4,048,359; and 3,852,092 discuss incorporating such materials into fabrics. U.S. Pat. No. 3,802,945 discussed the incorporation of such crystals into decorative novelty devices to be worn. U.S. Pat. No. 4,464,064 also teaches the use of such crystals as part of a room thermometer device.

Thermally responsive chemical temperature measuring devices have certain advantages and disadvantages when compared with mercury/glass and electronic thermometers. The primary advantages to the thermally responsive chemical devices are that they are essentially nonbreakable, contain no electrical or moving mechnical parts to wear or fail, and operate continuously as long as they are held against a patient, without the need to be reset. There are several disadvantages to these devices. They must have a separate, encapsulated chlorestic ester formulation for each discrete temperature indication. They are not designed for internal use. They are applied to a portion of the body, such as the face or chest, where they are visible in order to be read. Mostly, they are either adhered or simply placed upon the patient.

None of the aforesaid devices are optimally suited for continuous temperature sensing and temperature display from the preferred external body temperature measuring location, the armpit. Nor are any of the aforesaid devices particularly suited for the unattended temperature monitoring of infants.

SUMMARY OF THE INVENTION

Briefly stated, the invention is a garment adapted for continuously measuring and monitoring an infant's body temperature by electrical or chemical means.

According to one embodiment of the invention, a garment adapted to be worn on an infant's torso, including the infant's armpits, includes a temperature sensor at an armpit of the garment for sensing armpit temperature of an infant wearing the garment, a visual display on an outer portion of the garment at a visible location spaced from the armpits of the garment for displaying an indication of the armpit temperature of the infant wearing the garment, and a flexible connector operably coupling the sensor with the visual display device. The visual display is suggestedly located on a sleeve or a shoulder portion of the garment for greater visibility. A second visual display unit may be provided on a second outer portion of the garment spaced from the armpits for even greater visibility. The second display may be operably connected by a flexible coupling with the sensor or with a second sensor located in a second armpit in the garment for a second body temperature measurement.

According to another aspect of the invention, the display device includes a plurality of encapsulated liquid crystals formulations. Each of the encapsulated liquid crystal formulations changes physical state at a predetermined temperature, different from the predetermined temperature of the remaining encapsulated formulations. An important feature of this aspect of the invention is that the temperature sensor and flexible coupling are simultaneously provided by a metallic heat transfer member which thermally couples the infant's armpit with the plurality of encapsulated liquid crystal formulations.

According to another embodiment of the invention, a garment, adapted to be worn on an infant's torso including the infant's armpits, includes a temperature sensor at an armpit of the garment for sensing armpit temperature of an infant wearing the garment and a radio antenna operably coupled with the temperature sensor for transmitting a radio signal from the sensor indicating armpit temperature of an infant wearing the garment. This aspect of the invention may also be combined with a visual display device positioned on an outer portion of the garment at a visible location spaced from the armpits for simultaneously displaying the sensed armpit temperature on the garment.

BRIEF DESCRIPTION OF THE DRAWINGS

The foregoing summary, as well as the following detailed description, will be better understood when read in conjunction with the appended drawings. For the purpose of illustrating the invention, there is shown in the drawings various embodiments which are presently preferred. It being understood, however, that this invention is not limited to the precise arrangements and instrumentalities shown. In the drawings:

FIG. 1 depicts a first electronic embodiment of the invention incorporated into an infant's garment, such as an infant's top.

FIG. 2 depicts diagrammatically an alternative electronic embodiment incorporating shoulder mounted graphic temperature displays.

FIG. 3 depicts a third alternate electronic embodiment incorporating an antenna into the temperature sensor unit for radio transmission of a temperature indicating signal.

FIG. 3a depicts diagrammatically a portable receiver.

FIG. 4 depicts diagrammatically a preferred embodiment of the invention employing a temperature responsive liquid crystal temperature sensing/display device.

FIG. 5 depicts the device of FIG. 4 removed from the garment.

FIG. 6 is a diagrammatic cross section through the device of FIG. 5, along the lines 6—6.

FIG. 7 is a diagrammatic cross section through the device of FIG. 5 along the lines 7—7.

DETAILED DESCRIPTION OF THE INVENTION

FIG. 1 depicts a first electrical embodiment of the invention, preferred for minimum cost. A garment 10 sized and shaped in a conventional manner so as to be worn on an infant's upper body includes a torso portion 12 with armpits 14 and 15. The garment 10 includes a pocket 16 in one armpit 14 for removably receiving an electronic temperature sensor 18. Pocket 16 may be formed by a tab of cloth 17 sewn over the armpit 14 of the garment 10 and securely holds the sensor 18 against the armpit of the infant wearing the garment 10. The sensor 18 is configured to fit into the infant's armpit and includes a temperature responsive surface and internal electronic circuitry for developing an electric signal indicating the infant's temperature to drive a conventional electronic digital display, such as an electrically responsive crystal device 20. A hole (not depicted) may be provided in the torso of the garment 10 beneath the tab 17, to directly thermally couple the sensor 18 with the infant's armpit. A flexible electrical lead 22 functionally couples the display device 20 to the sensor 18 and its internal circuitry. The lead 22 carries an electrical signal generated by the sensor to the display device 20 for driving the display device 20. The device 20 is located, preferably removably attached, on an outer portion of the garment 10 at a location spaced from the armpits 14 and 15 for visibility. For example, a clear plastic pocket 24 may be attached on an upper outer portion of a sleeve 26 of the garment 10 for receiving the digital display device 20. An opening 25 at the top of the pocket 24 for removably receiving the device 20 may be self closing, or closed by conventional means such as mating velcro strips, mating snaps, etc. (not depicted). A second identical display device 20' can be provided in a second pocket 24' (both in phantom) on the outer side of a second sleeve 32 of the garment 10 for even greater visibility of displayed temperature. The display device 20' is electrically coupled with the sensor 18' by a second lead 34 (in phantom). The garment 10 provides a means for holding the sensor 18 in thermal contact with the infant without the use of tape or adhesive, and also a means for comfortably locating a temperature indicating display on the infant. The sensor 18 continuously senses armpit temperature of the infant wearing the garment 10 and continuously displays the sensed armpit temperature on the infant by means of the display 20 or at two separate locations by displays 20 and 20'.

FIG. 2 depicts a second embodiment of the invention of FIG. 1. Another infant's top 100 includes a torso portion 112 having armpits 114 and 115. A pocket 116 is located in one armpit 114 for receiving the electronic temperature sensor 18. An electronic temperature display device 120 with a linear scale output is held by snaps 124 and 125 sewn into a shoulder area 126 of the garment 100. Again, an electrical lead 122 functionally couples the display device 120 with the display driving circuitry of the sensor 18. The lead 122 carries an electrical signal generated by the sensor 18 indicating armpit temperature of the infant to the device 120 for a graphical, as opposed to arithmetic, visual display of the infant's body temperature. A second identical sensor 18' is positioned in a pocket 130 sewn into the other armpit 115 of the garment 100. A second display device 120', identical to device 120, is mounted in a similar fashion to the opposing shoulder 127 of the garment 100 and functionally coupled with the second sensor 18' through a second lead 134 carrying an electrical signal indicating armpit temperature generated by the sensor 18' to the display 120' for display. This embodiment is preferred, because it provides two independent measurements of infant armpit temperature with two displays for more complete monitoring. Thus, if the infant should lie in one position where one sensor is thermally decoupled from the infant's armpit, the second sensor may remain coupled. The use of a second sensor 18' also eliminates the use of a long, flexible lead (i.e., 34 in FIG. 1) across the chest of the infant, which may be undesirable for several reasons including safety, comfort and convenience. Apart from the described differences operation is again as in FIG. 1, i.e. locating one or more body temperature displays on a visible portion of the infant's upper torso, locating a temperature response sensor in an armpit of the infant, operably coupling the display with the sensor located in the armpit and continuously displaying the infant's armpit temperature.

Although not indicated in FIGS. 1 or 2, one of ordinary skill in the art will realize that mating connectors nectors may be provided between the individual leads 22, 34, 122, 134 and the connected sensor 18, 18', or the connected display 20, 20', 120, 120' for modular removal or replacement of the components. While the leads are exposed on the garments 10, 100, they also may be passed through sleeves formed in or attached to the garment 10, 100 for greater safety, comfort and attractiveness.

FIG. 3 illustrates a third electrical embodiment of the invention. A self-powered, electronic sensor 118 positioned in one armpit area 154 of an infant's upper torso garment 150 includes circuitry and a radio transmission antenna 160 operably coupled within the sensor 118 to radio transmit a signal to a remote radio receiver 170 indicative of the sensed temperature of the infant. The receiver 170 includes a temperature indicating visual display 172 for responding to the radio signal and continuously indicating the armpit temperature of the infant wearing the garment 150. In this way, the armpit temperature of the infant is continuously sensed and a signal indicating sensed armpit temperature is continuously radio transmitted from the infant to a receiver remote from the infant. The garment 150 can also be provided with a sleeve (not depicted for clarity) to receive and contain the antenna 160. A display 20 can be located on an outer portion of the garment 150 spaced from armpit 154 and the other armpit 156 of the garment and operably coupled with sensor 118 by a lead 22 (both lead 22 and display 20 are in phantom). The receiver may also be provided with one or more alarm devices such as a light 174 or speaker 176 (both indicated diagrammatically) to indicate when a predetermined temperature value or either of a pair of values, such as above 102° F., or below 98° F., is crossed, thereby relieving the care provider from having to regularly check the receiver 170. The receiver may be a console type as depicted or portable; placed in the same room or a different room from the infant or carried from location to location by the care giver; and powered by line current, battery or both (i.e. nickel-cadmium rechargeable battery system). Apart from these differences, basic operation is again the same as in FIGS. 1 and 2.

FIG. 3a depicts a portable receiver 180 that may be worn by the care giver which includes a case 182 carrying a belt clip 184 or other means of attachment. A speaker element 186 (in phantom) is provided in the case 182 beneath openings 188 for an aural alarm while a light 190 is mounted for a visual alarm. The case 182 also includes an electronic display device 192 for a visual display of the infant's armpit temperature. The various components 186, 190, 192 are powered by a battery 194 (which may be of the rechargeable type) in the case 182.

FIG. 4 depicts a non-electrical, thermochemical embodiment of the invention. Again, an infant's upper body garment 200, such as a top, is provided with a vertical slit 202 in the front of the armpit region 214 of the torso portion 212 of the garment about where the torso portion 212 is exposed from under a sleeve 226 or the infant's arm if sleeves are not provided. One arm 224 of a unitary, chemical, temperature responsive sensor/display device 218 extends through the slit 202 and into a pocket 216 provided on the front of the torso portion 212 of the garment 200, spaced from the slit 202 and adapted to receive and retain an end 225 of the arm 224. The device 218 includes an enlarged central portion 220 (indicated in phantom) integrally coupled with the arm 224 and located on the inner side of the garment 200 in the armpit area 214 of the torso portion 212 of that garment. Another slit, like slit 202, is provided on the rear side of the armpit area 214 of the torso portion 212 of the garment 200 to permit another arm of the device 218, like arm 224, to extend from the back side of the armpit and across a portion of the back of the torso portion 212 of the garment 200 to provide a similar temperature display on the infant's back. If desired, a second identical sensor/display device 218' can be added to the garment in the second armpit 214' of the garment 200.

The unitary sensor/display device 218 is depicted diagrammatically in FIG. 5. The device 218 includes a central body portion 220 and a pair of opposing, identical arms 224, 224'. Extending across the center portion 220 and each arm 224, 224' are a plurality of liquid crystal display beads 232. Each of the beads 232 includes a different chlorestic ester formulation, which changes state at a predetermined temperature value different from the predetermined temperatures at which the other beads 232 change state, to provide a graphic indication of infant body temperature. Different temperature values 234 can be provided on the arms 224, 224' to identify the temperature associated with each chlorestic ester bead 232. The sensor/display 218 also includes a heat transfer device 240 (in phantom) mounted in the sensor/display 218 so as to be in thermal communication with the armpit of the infant wearing the garment 200 in the central region 220 of the device 218 and in thermal communication with each of the beads 232 in the arms 224, 224' of the device 218 to transfer heat from the infant's armpit to each of the beads, causing the appropriate thermal reaction of the beads 232.

The construction of the sensor 218 is depicted in FIGS. 6 and 7. Each of beads 232 is formed by a filament of encapsulated chlorestic ester liquid crystal formulation and is sandwiched between a thick plastic outer sheet 242 and a flexible metallic heat transfer element 244 is held against the filaments 232 by a second thicker outer plastic laminate sheet 246. The outer sheets 242 and 246 are preferably sufficiently thick in the arm areas 224, 224' to inhibit thermal losses. As shown in FIG. 7, the outer plastic sheet 246 is omitted from the body portion 220 of the device 218 so as to permit optimal thermal contact between the heat transfer device 240 and the infant wearing the device 218. The place of sheet 246 in the body portion 220 is taken by a second metallic element 248 thicker than element 244 which forms with flexible element 244, the heat transfer device 240. The body portion 220 can also be shaped so as to conform more closely to the contour of the infant armpit. The heat transfer device 240 is preferably similarly contoured to maximum heat transfer. In this way, the armpit of the infant is thermally coupled with the portions of the beads 232 located on the arms 224 and 224' which are spaced from the armpit 214 sufficiently so as to be visible. Encapsulation of liquid crystals into filaments is disclosed in U.S. Pat. No. 4,048,359 while chlorestic ester liquid crystal formulations suitable for measuring human temperatures are disclosed in U.S. Pat. No. 4,070,912, both incorporated by reference.

Beads 232 extending continuously across the central body portion 220 of the device 218 are depicted to optimize heat transfer into each bead 232. However, one of ordinary skill in the art will appreciate that the beads can be laid down only in the arm portion 224, 224' if desired. Also, while linear beads are depicted for a bar graph type display, other shapes such as circular dots of different chlorestic ester formulations to represent different temperatures may be employed. While ordinal numbers 234 are indicated on the device 218 for individual degree reading, one of ordinary skill in the art will appreciate that fewer beads 232 might be provided to indicate fewer, broader ranges of temperature, such as subnormal, normal, slight fever and high fever, and that other visual indication designs employing the encapsulated liquid crystals, such as varying color indications, might be employed.

In utilizing the present invention, the temperature of an infant or other user can be continuously monitered without having to disrupt normal activities, such as sleeping. Moreover, the present invention is non-intrusive in that nothing need be periodically inserted or applied to the infant or user in order to obtain a continuous temperature measurement.

It will be recognized by those skilled in the art that changes may be made to the above-described embodiments without departing from the broad inventive concepts thereof. It is understood, therefore, that this invention is not limited to the particular embodiments disclosed, but it is intended to cover any modifications which are within the scope and spirit of the invention as defined by the appended claims.

I claim:

1. An infant temperature monitoring apparatus comprising:

A garment adapted to be worn on an infant's upper torso including the infant's armpits;

temperature sensing means supported by a pocket in an armpit of the garment for sensing armpit temperature of an infant wearing the garment;

first visual display means mounted on an outer portion of the garment by a clear plastic pocket at a visible location spaced from the armpits of the garment for displaying an indication of the body temperature of an infant wearing the garment; and first flexible connecting means for operably coupling the sensor means with the first visual display means.

2. The apparatus of claim 1 further comprising:

second visual display means secured to the garment on a second outer portion of the garment spaced from the armpits and spaced from the first visual display means; and second flexible connecting means for operably coupling said sensor means with said second visual display means.

3. The apparatus of claim 1 wherein said first visual display means is mounted in a clear plastic pocket on a sleeve portion of the garment.

4. The apparatus of claim 1 wherein said first visual display means is located in a clear plastic pocket on a shoulder portion of the garment.

5. A method of continuously monitoring an infants's temperature comprising the steps of:

mounting a body temperature display means within a clear plastic pocket on a garment to be worn by the infant on a visible portion of an infant's upper torso;

mounting a temperature responsive sensor within a pocket on the garment in an armpit of the infant;

operably coupling the display means with the sensor locted in the armpit; and continuously displaying the infant's armpit temperature on the display means.

6. An infant temperature monitoring apparatus comprising:

a garment adapted to be worn on an infant's upper torso including the infant's armpits;

temperature sensing means supported by a pocket in an armpit of the garment for sensing armpit temperature of an infant wearing the garment;

first visual display means mounted on an outer portion of the garment by snap fastener means at a visible location spaced from the armpits of the garment for displaying an indication of the body temperature of an infant wearing the garment; and first flexible connecting means for operably coupling the sensor means with the first visual display means.

7. The apparatus of claim 6 further comprising:

second visual display means secured to the garment on a second outer portion of the garment spaced from the armpits and spaced from the first visual display means; and second flexible connecting means for operably coupling said sensor means with said second visual display means.

8. The apparatus of claim 6 wherein said first visual display means is mounted by snap fastener means on a sleeve portion of the garment.

9. The apparatus of claim 6 wherein said first visual display means is mounted by snap fastener means on a shoulder portion of the garment.

10. A method of continuously monitoring an infant's temperature comprising the steps of:

mounting a body temperature display means by snap fastener means on a garment to be worn by the infant on a visible portion of an infant's upper torso;

mounting a temperature responsive sensor within a pocket on the garment in an armpit of the infant;

operably coupling the display means with the sensor located in the armpit; and continuously displaying the infant's armpit temperature on the display means.

* * * * *